US012744966B2

(12) United States Patent
Ichimiya et al.

(10) Patent No.: US 12,744,966 B2
(45) Date of Patent: Sep. 22, 2026

(54) CONTROL DEVICE, CONTROL METHOD, AND RECORDING MEDIUM

(71) Applicant: Panasonic Intellectual Property Management Co., Ltd., Osaka (JP)

(72) Inventors: Hisashi Ichimiya, Osaka (JP); Yusuke Maekawa, Hyogo (JP); Hideo Nakanishi, Osaka (JP)

(73) Assignee: Panasonic Intellectual Property Management Co., Ltd, Osaka (JP)

(*) Notice: Subject to any disclaimer, the term of this patent is extended or adjusted under 35 U.S.C. 154(b) by 245 days.

(21) Appl. No.: 18/280,402

(22) PCT Filed: Oct. 8, 2021

(86) PCT No.: PCT/JP2021/037485
§ 371 (c)(1),
(2) Date: Sep. 5, 2023

(87) PCT Pub. No.: WO2022/190446
PCT Pub. Date: Sep. 15, 2022

(65) Prior Publication Data

US 2024/0155192 A1 May 9, 2024

(30) Foreign Application Priority Data

Mar. 11, 2021 (JP) ................................ 2021-039093

(51) Int. Cl.
*H04N 21/44* (2011.01)
*H04N 21/462* (2011.01)
(Continued)

(52) U.S. Cl.
CPC ..... *H04N 21/462* (2013.01); *H04N 21/44008* (2013.01); *H04N 21/4662* (2013.01); *H04N 21/485* (2013.01)

(58) Field of Classification Search
CPC .......... H04N 21/462; H04N 21/44008; H04N 21/4662; H04N 21/485
(Continued)

(56) References Cited

U.S. PATENT DOCUMENTS 7,755,566 B2 * 7/2010 Hoisko ............. H04N 1/32128 345/632
2012/0206493 A1 * 8/2012 Koike ................. H04N 21/431 345/660

(Continued)

FOREIGN PATENT DOCUMENTS

| | | | |
|---|---|---|---|
| EP | 2495962 | A1 | 9/2012 |
| EP | 2916557 | A1 | 9/2015 |
| JP | 2006-277232 | A | 10/2006 |

OTHER PUBLICATIONS

Extended European Search Report dated Jun. 11, 2024 issued in the corresponding European Patent Application No. 21930293.2.

(Continued)

*Primary Examiner* — Alfonso Castro
(74) *Attorney, Agent, or Firm* — Rimon P.C.

(57) ABSTRACT

A control device includes: an obtainer that obtains content and first type information indicating a type of the content; a determiner that performs type determination processing on the content obtained by obtainer, to obtain second type information indicating a type of the content; and a generator that generates and outputs control information for increasing intensity of a presentation effect to be applied at a time of presentation of the content when the first type information and the second type information match, compared to when the first type information and the second type information do not match.

20 Claims, 8 Drawing Sheets

(51) Int. Cl.
*H04N 21/466* (2011.01)
*H04N 21/485* (2011.01)

(58) Field of Classification Search
USPC ........................................................... 725/37
See application file for complete search history.

(56) References Cited

U.S. PATENT DOCUMENTS

2015/0103250 A1* 4/2015 Watanabe ................. G06T 5/40
348/576
2015/0256891 A1* 9/2015 Kim ................. H04N 21/44008
725/39
2021/0385533 A1* 12/2021 Daly ................ H04N 21/41407

OTHER PUBLICATIONS

International Search Report issued on Dec. 21, 2021 in International Patent Application No. PCT/JP2021/037485, with English translation.

* cited by examiner

FIG. 4

| # | Content | Type |
|---|---|---|
| #1 | | Sport |
| #2 | | Music |
| #3 | | Talk |
| ... | ... | ... |

FIG. 8

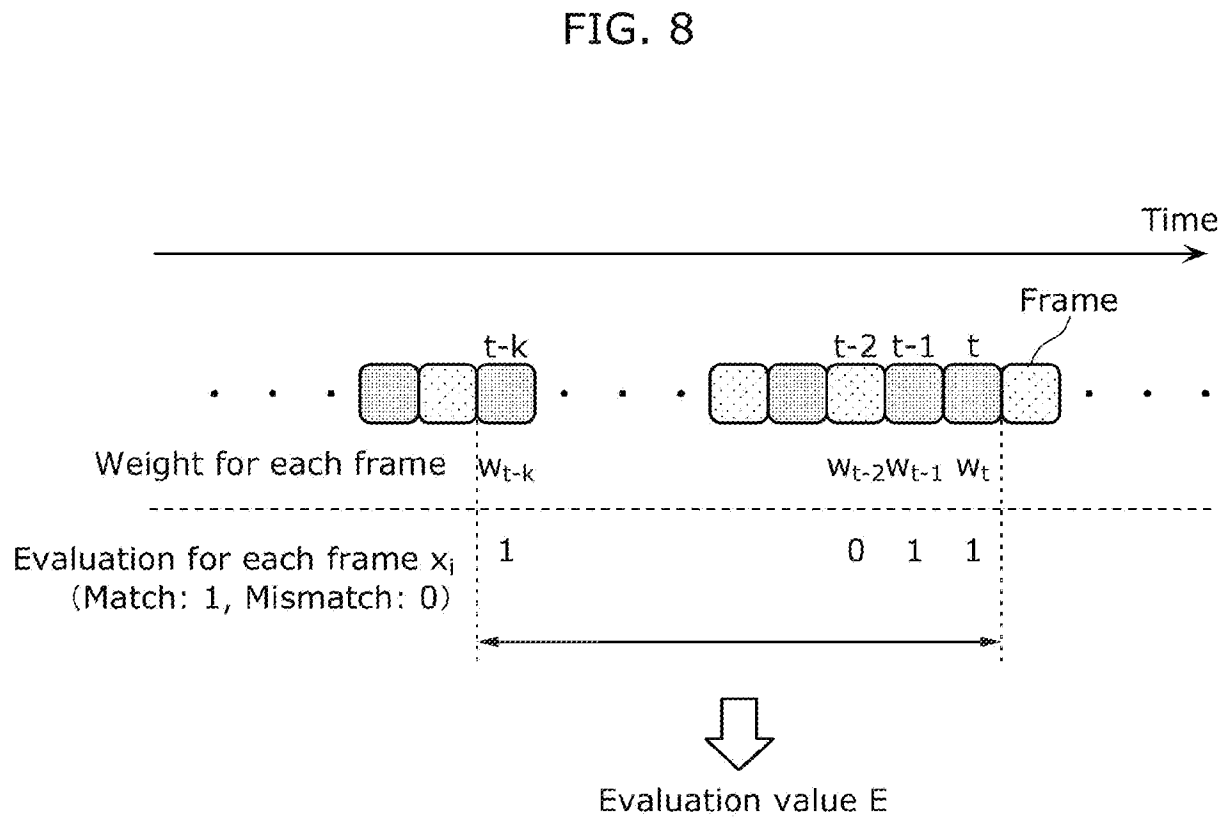

Time

Frame t-k t-2 t-1 t

Weight for each frame $W_{t-k}$ $W_{t-2}$ $W_{t-1}$ $W_t$

Evaluation for each frame $x_i$
(Match: 1, Mismatch: 0)

1

0 1 1

Evaluation value E

FIG. 12

CONTROL DEVICE, CONTROL METHOD, AND RECORDING MEDIUM

CROSS-REFERENCE OF RELATED APPLICATIONS

This application is the U.S. National Phase under 35 U.S.C. § 371 of International Patent Application No. PCT/JP2021/037485, filed on Oct. 8, 2021, which in turn claims the benefit of Japanese Patent Application No. 2021-039093, filed on Mar. 11, 2021, the entire disclosures of which Applications are incorporated by reference herein.

TECHNICAL FIELD

The present disclosure relates to a control device, a control method, and a recording medium.

BACKGROUND ART

Conventionally, there has been technique for classifying, by a type, content that is video data, and for controlling a presentation effect based on the type.

For example, there is technique in which images included in video data are classified to types by analyzing features of the images.

CITATION LIST

Patent Literature

[PTL 1]

Japanese Unexamined Patent Application Publication No. 2006-277232

SUMMARY OF INVENTION

Technical Problem

However, an error may occur in the classification of the type based on the features of an image, preventing a presentation effect of content from being controlled appropriately.

In view of the above, the present disclosure provides a control device or the like that appropriately controls the presentation effect based on the type of content.

Solution to Problem

A control device according to the present disclosure includes: an obtainer that obtains content and first type information indicating a type of the content; a determiner that performs type determination processing on the content obtained by the obtainer, to obtain second type information indicating a type of the content; and a generator that generates and outputs control information for increasing intensity of a presentation effect to be applied at a time of presentation of the content when the first type information and the second type information match, compared to when the first type information and the second type information do not match.

A control method according to the present disclosure includes: obtaining content and first type information indicating a type of the content; performing type determination processing on the content obtained, to obtain second type information indicating a type of the content; and generating and outputting control information for increasing intensity of a presentation effect to be applied at a time of presentation of the content when the first type information and the second type information match, compared to when the first type information and the second type information do not match.

Advantageous Effects of Invention

A control device according to the present disclosure can appropriately control a presentation effect based on a type of content.

BRIEF DESCRIPTION OF DRAWINGS

FIG. 4 is an explanatory diagram showing an example of training data used for learning of type determination by a determiner according to the embodiment.

FIG. 8 is an explanatory diagram of frames used for calculation in filter processing performed by the generator according to the embodiment.

FIG. 12 is a flowchart showing a control method of the control device according to the embodiment.

DESCRIPTION OF EMBODIMENTS

Figure 1:
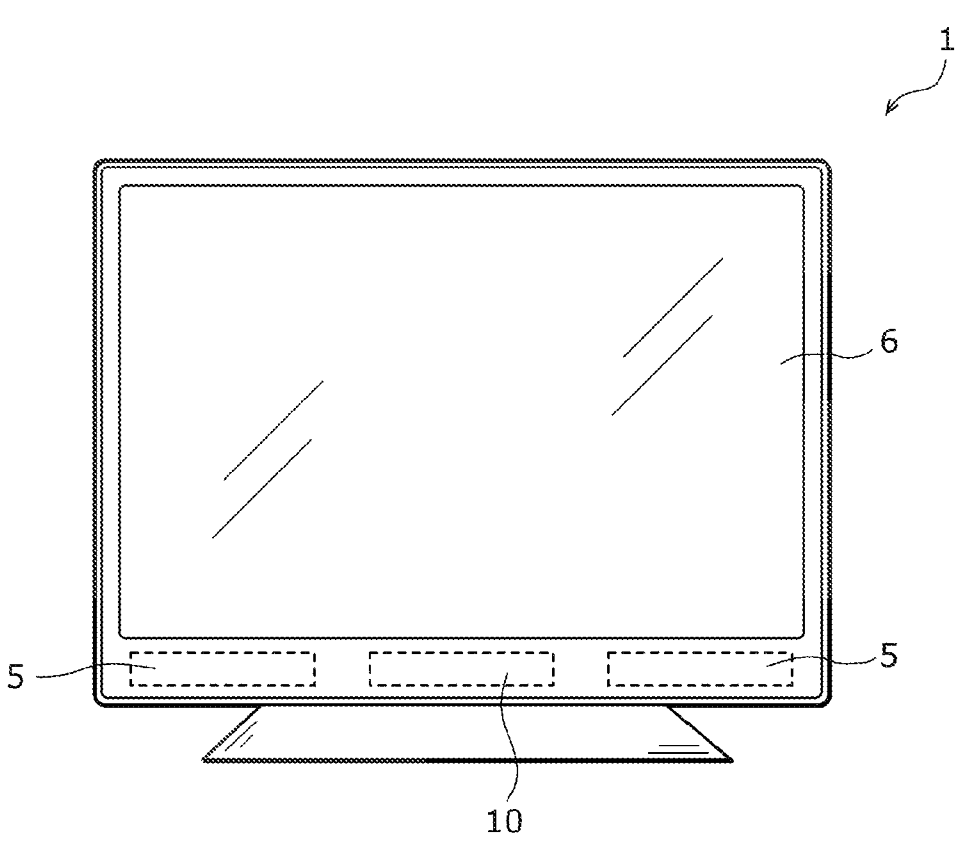
FIG. 1 is an explanatory diagram showing an appearance of a device provided with a control device according to an embodiment.

The inventor of the present application has found that the following problems arise in conventional control of presentation effects based on a content type.

The type of content is classified based on, for example, official program information (also referred to as service information (SI)) assigned to a broadcast program. The type is, for example, sport, music, talk, cinema, and the like.

However, when content is classified into types based on SI, the classification may not be appropriately performed when a part to be classified into multiple types is included in a single broadcast program. In that case, presentation effects may not be appropriately controlled when the content is presented.

For example, a part of a broadcast program featuring a soccer game may include scenes of a soccer player speaking in a studio. In this case, the broadcast program as a whole is classified into the sport category, and a presentation effect suitable for the sport category is applied to the broadcast program as a whole. In a scene in which a soccer player speaks, it is appropriate to provide a presentation effect suitable for content of the talk type, but a presentation effect suitable for the content of the sport type is provided. In other words, an inappropriate presentation effect is applied.

In view of the above, the present disclosure provides a control device or the like that appropriately controls the presentation effect based on types of content.

A control device according to an aspect of the present disclosure includes: an obtainer that obtains content and first type information indicating a type of the content; a determiner that performs type determination processing on the content obtained by the obtainer, to obtain second type information indicating a type of the content; and a generator that generates and outputs control information for increasing intensity of a presentation effect to be applied at a time of presentation of the content when the first type information and the second type information match, compared to when the first type information and the second type information do not match.

According to the aspect described above, the control device uses the type information obtained by the obtainer and the type information obtained by the determiner through the type determination processing. Accordingly, it is possible to perform control of applying, with higher intensity, a presentation effect corresponding to a type that is determined more appropriately. Therefore, the control device can appropriately control the presentation effect based on the content type.

For example, in the type determination processing, the determiner may input the content to a recognition model constructed by machine learning, and may obtain type information of the content, which is output by the input of the content to the recognition model, as the second type information.

According to the aspect described above, the determiner obtains the type of content using the recognition model constructed by the machine learning, so that the control device can obtain the type of content more appropriately. Therefore, the control device can perform more appropriate control on the presentation effect based on the type of content.

For example, the first type information may indicate the type of the content as a whole, and the determiner may determine a type of each of a plurality of items of partial content included in the content.

According to the aspect described above, the control device performs control of increasing intensity of the presentation effect to be applied when presenting a partial content whose type information matches type information of the content as a whole, among the plurality of items of partial content included in the content. Therefore, the control device can perform appropriate control on the presentation effect based on the type of content for each partial content.

For example, the obtainer may obtain, as the first type information, information set as information indicating the type of the content from a device different from the control device.

According to the aspect described above, the control device obtains the information set as the information indicating the type of the content as the first type information, to thereby obtain the first type information more easily. In other words, the control device can obtain the first type information without performing the processing of determining the type of content. This eliminates the necessity of power consumption required for the processing or resources such as hardware used for the processing. Therefore, the control device can perform control more easily and appropriately on the presentation effect based on the type of content.

For example, the obtainer may obtain type information of the content, which is obtained by analyzing the obtained content, as the first type information.

According to the aspect described above, the control device obtains the information obtained by analyzing the content, as the first type information. Accordingly, even if there is no other device that provides the information indicating the content type, the first type information can be obtained. Therefore, the control device can perform control appropriately on the presentation effect based on the content type.

For example, the control information may include information indicating in time series the intensity of the presentation effect at the time of presentation of the content.

According to the aspect described above, the control device can control the presentation effect in chronological order using the control information shown in the chronological order. Therefore, the control device can perform control more appropriately on the presentation effect based on the type of the content.

For example, the generator may perform processing for preventing a rapid change in the intensity of the presentation effect at the time of presentation of the content, when generating the control information.

According to the aspect described above, the control device controls the presentation effect using the control information in which a rapid change in the intensity of the presentation effect is prevented. Accordingly, the rapid change in the intensity of the presentation effect to be applied is prevented. Therefore, the control device can perform control appropriately on the presentation effect based on the type of content while preventing the rapid change of the intensity.

For example, the generator may have association information in which type information indicating the type of the content and the presentation effect to be applied at the time of presentation of the content of the type are associated in advance, and may generate, as the control information, control information for applying the presentation effect associated in advance with the first type information, when generating the control information.

According to the aspect described above, the control device can apply a presentation effect associated, in advance, with a type of content while controlling the intensity of the presentation effect. Therefore, the control device can appropriately control the presentation effect while appropriately applying the presentation effect corresponding to the type of the content.

For example, the generator may generate, as the control information, control information for increasing intensity of at least one of a sound effect or a video effect as the presentation effect at the time of presentation of the content.

According to the aspect described above, the control device controls at least one of the sound effect or the video effect as the presentation effect. Therefore, the control device can perform control appropriately on the sound effect or the video effect based on the type of content.

For example, the generator may receive an operation of setting an intensity range of the presentation effect from a user, and may generate the control information for controlling the presentation effect within the intensity range set through the operation.

According to the aspect described above, the control device controls the intensity of the presentation effect within the range received from the user. Therefore, the control device can perform control more appropriately on the presentation effect based on the type of content, with the intensity reflecting the user's choice regarding the intensity of the presentation effect.

A control method according to an aspect of the present disclosure includes: obtaining content and first type information indicating a type of the content; performing type determination processing on the obtained content, to obtain second type information indicating a type of the content; and generating and outputting control information for increasing intensity of a presentation effect to be applied at a time of presentation of the content when the first type information and the second type information match, compared to when the first type information and the second type information do not match.

According to the aspect described above, the control method provides the same effect as the control device does.

A recording medium according to an aspect of the present disclosure is a non-transitory computer-readable recording medium having recorded thereon a program for causing a computer to execute the control method described above.

According to the aspect described above, the recording medium provides the same effect as the control device does.

Hereinafter, embodiments are described, with reference to the drawings appropriately. However, more detailed description than necessary may be omitted. For example, a detailed description of a well-known matter and a redundant description of substantially the same configuration may be omitted. This is to avoid unnecessary redundancy in the following description and to facilitate understanding by those skilled in the art.

It should be noted that the inventor provides the accompanying drawings and the following description for those skilled in the art to fully understand the present disclosure, and is not intended to limit the claimed subject matter by the description and the drawings.

EMBODIMENTS

In the present embodiment, a control device that appropriately controls the presentation effect based on a type of content will be described.

FIG. 1 is an explanatory diagram showing an appearance of a device provided with control device 10 according to the present embodiment. An example of the device that is provided with control device 10 is television receiver 1.

Television receiver 1 receives a signal containing content including audio and video, and presents the audio and video included in the content. The signal includes, for example, a signal contained in a broadcast wave transmitted from a broadcasting station by a broadcast wave, a signal transmitted from various transmission sources via a communication line, or a signal transmitted from an external device. The various transmission sources include, for example, a server for a video providing service on the Internet. The external device includes, for example, a recording device, a computer, a game machine, and the like. Hereinafter, a case where television receiver 1 receives a signal included in a broadcast wave will be described as an example.

Television receiver 1 includes a tuner (not shown), loudspeaker 5, and screen 6. Sound obtained from the signal contained in the broadcast wave through the tuner is output from loudspeaker 5, and an image obtained from the signal contained in the broadcast wave through the tuner is displayed on screen 6.

It should be noted that content includes a signal or data with a certain length of time, which include at least video. In addition, the content may be data with a certain length of time, which includes audio and video. The content may correspond to a single broadcast program, or may correspond to a part, which has a predetermined length of time, of a single broadcast program. The length of time of content is, for example, equal to or longer than a length of time corresponding to one frame of video and is equal to or shorter than several seconds to several hours.

Furthermore, content may further include meta information. The meta information may include official program information (also referred to as service information (SI)).

Although a case in which control device 10 is provided in television receiver 1 will be described as an example, control device 10 is not limited thereto, and may be provided in a recording machine that receives broadcast waves, stores content, and then reproduces the content.

Control device 10 outputs control information for controlling a presentation effect to be applied when television receiver 1 reproduces content. Control device 10 obtains a broadcast wave received by television receiver 1 and determines which type of content among a plurality of predetermined types the content obtained from a signal included in the broadcast wave belongs to. Then, control device 10 generates and outputs control information for controlling the presentation effect when the content is presented. The control information contains information indicating a type of the content and information indicating intensity of the presentation effect when the content is presented (described later). The types of content include, for example, sport, music, talk, cinema, and the like. It should be noted that a type that does not correspond to any of the aforementioned types will be referred to as default.

Figure 2:
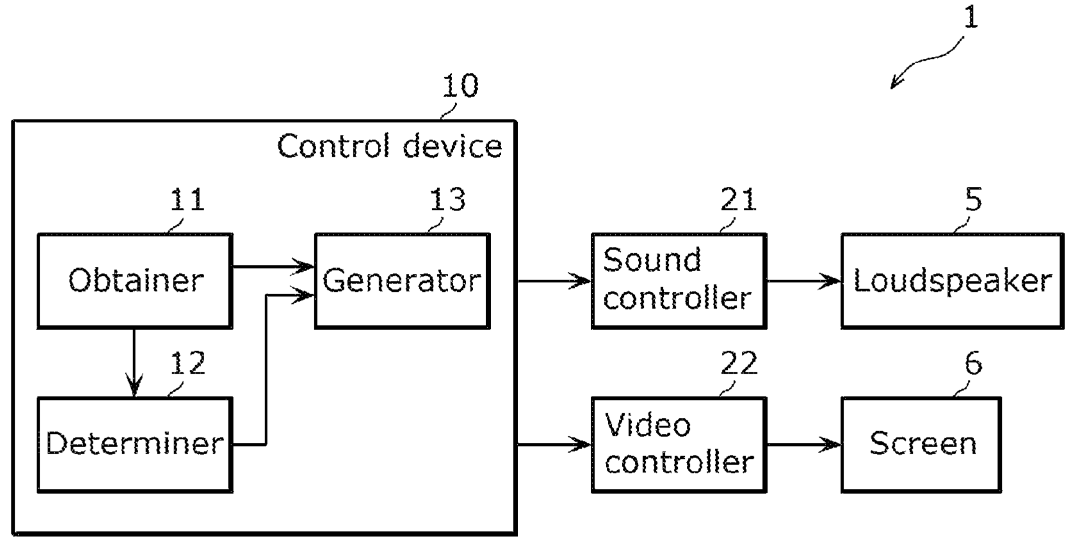
FIG. 2 is a block diagram showing a functional configuration of the control device according to the embodiment.

FIG. 2 is a block diagram showing a functional configuration of control device 10 according to the present embodiment.

As shown in FIG. 2, control device 10 includes obtainer 11, determiner 12, and generator 13. Control device 10 is also connected to sound controller 21 and video controller 22, which are provided in television receiver 1. The functional units provided in control device 10 can be embodied by a processor (a central processing unit (CPU), for example) (not shown) provided in control device 10 executing a predetermined program using a memory (not shown).

Obtainer 11 is a functional unit that obtains content and also obtains type information (corresponding to first type information) indicating a type of the content.

The content obtained by obtainer 11 is content obtained by television receiver 1 from a broadcast wave or the like. Obtainer 11 provides the obtained content to determiner 12 and generator 13.

The type information obtained by obtainer 11 is information indicating a type of the content as a whole, which is obtained by obtainer 11. In other words, one piece of information is provided to the content as a whole. The type information to be obtained by obtainer 11 may be meta information (SI, for example) set by a device outside control device 10, as information indicating a type of content obtained by obtainer 11. The outside device may be a device owned by a television station that provides broadcast programs, a device owned by a third party that generates the meta information, or may be a dedicated device for providing control device 10 with the meta information.

When the content obtained by obtainer 11 is content received by television receiver 1 according to high-definition multimedia interface (HDMI (registered trademark)) standard, the type information may be obtained from the HDMI (registered trademark) Content Type.

The type information obtained by obtainer 11 may be type information obtained by analyzing the content obtained by obtainer 11. In that case, obtainer 11 performs processing of analyzing features in video data, audio data and meta information of the content. Specifically, obtainer 11 performs processing of detecting a human sight line included in the video of the content, processing of detecting movement of an object included in the video of the content, processing of detecting a specific sound included in the audio of the content, or processing of detecting a pattern of an object included in the image of the content, thereby specifying the type of the content. For analysis of the video data and the audio data, well-known image recognition technique and sound recognition technique (speech recognition technique) can be used. Obtainer 11 determines the type of content based on the detection of predetermined information or data in the video, audio, or meta information of the content.

For example, in the processing of detecting a sight line, when sight line of a performer into camera is detected, a type of the content is determined to be "talk". In addition, in the processing of detecting object motion, when a relatively quick motion is detected, a type of the content is determined to be "sport", while when a relatively slow motion is detected, a type of the content is determined to be "talk". In the processing of detecting sound, when a singing voice or a sound played by a musical instrument is detected, a type of the content is determined as "music". In the processing of detecting an object pattern, when an image of a uniform is detected, a type of the content is determined as "sport", and when an image of a musical instrument is detected, a type of the content is determined as "music".

Determiner 12 is a functional unit that performs type determination processing on the content obtained by obtainer 11, to obtain type information (corresponding to second type information) indicating the type of content.

In the processing of determining a type, determiner 12 may input the content to a recognition model constructed in advance by machine learning, and may obtain the type information of the content that is output by the input of the content, as second type information.

More specifically, determiner 12 determines a type of each of a plurality of items of partial content included in the content. Here, the partial content is a part having a predetermined number of frames included in the content, and is for example, a part having one frame, ten frames, or thirty frames. It should be noted that the partial content may be a part that has a predetermined time length (for example, one second, five seconds, or ten seconds) included in the content.

It can also be said that determiner 12 obtains, through the type determination processing, a type of content obtained by obtainer 11 through a method different from a method through which obtainer 11 obtains a type of content. More specifically, it can be said that determiner 12 obtains a type of the content obtained by obtainer 11 without using the meta information, for example.

Generator 13 is a functional unit that generates and outputs control information for controlling the intensity of the presentation effect when content is presented. When the first type information obtained by obtainer 11 and the second type information obtained by determiner 12 match, generator 13 generates control information that increases the intensity of a presentation effect to be applied at a time of presentation of the content, compared to a case when the first type information and the second type information do not match. The presentation effect includes at least one of the sound effect or the visual effect. The control information is output to sound controller 21 and video controller 22.

Specifically, the control information includes information indicating in time series the intensity of a presentation effect to be applied when the content is presented. The control information indicates that a presentation effect with higher intensity is applied at a time of presentation of a plurality of items of partial content, when the first type information regarding content and the second type information regarding the partial content included in the content match.

Generator 13 has association information in which the type information indicating a type of content and a presentation effect to be applied at a time of presentation of the content of the type are associated in advance. Then, when generating the control information, generator 13 generates control information for applying the presentation effect associated in advance with the first type information.

The association information has, for example, the following information as association between the type information and the sound effect.

For example, content of the type "sport" is associated with the sound effect that increases spread of sound and changes an output direction of the sound so that a viewer feels as if he or she is surrounded by the sound. In addition, for content of the type "music", for example, speech signal processing is applied to change the way people hear sound so as to increase the spread of the sound, and a sound effect that changes the sound amplitude for each output frequency band is associated so that the vocal is emphasized. Furthermore, content in the "talk" type is associated with the sound effect that changes the speech amplitude for each output frequency band so that a viewer can easily hear the performer's voice.

In addition, the association information has, for example, the following information as the association between the type information and the video effect.

For example, the video effect that increases the brightness and sharpness of a video is associated with content of the type "sport" so as to make the video brighter and more vivid. For example, content of the type "cinema" is associated with the video effect that increases contrast while reducing the brightness of the video so that texture can be expressed richly.

It should be noted that generator 13 may perform processing for preventing a rapid change in the intensity of the presentation effect when generating the control information. This processing is also referred to as filtering processing. This processing is so-called low-pass filter processing, and can also be referred to as noise removal processing or smoothing processing.

Sound controller 21 is a functional unit that obtains control information output by generator 13 and controls sound output from loudspeaker 5 based on the control information. Sound controller 21 controls output, from loudspeaker 5, of the sound included in the content obtained by obtainer 11. At that time, sound controller 21 processes the sound to be output so that the sound effect is applied according to the intensity of the presentation effect included in the control information.

Video controller 22 is a functional unit that obtains control information output by generator 13 and controls display of an image on screen 6 based on the control information. Image controller 22 causes an image included in the content obtained by obtainer 11 to be displayed on screen 6. At that time, image controller 22 processes the image to be displayed so that the image effect is applied according to the intensity of the presentation effect contained in the control information.

Hereinafter, processing of control device 10 will be described in more detail.

Figure 3:
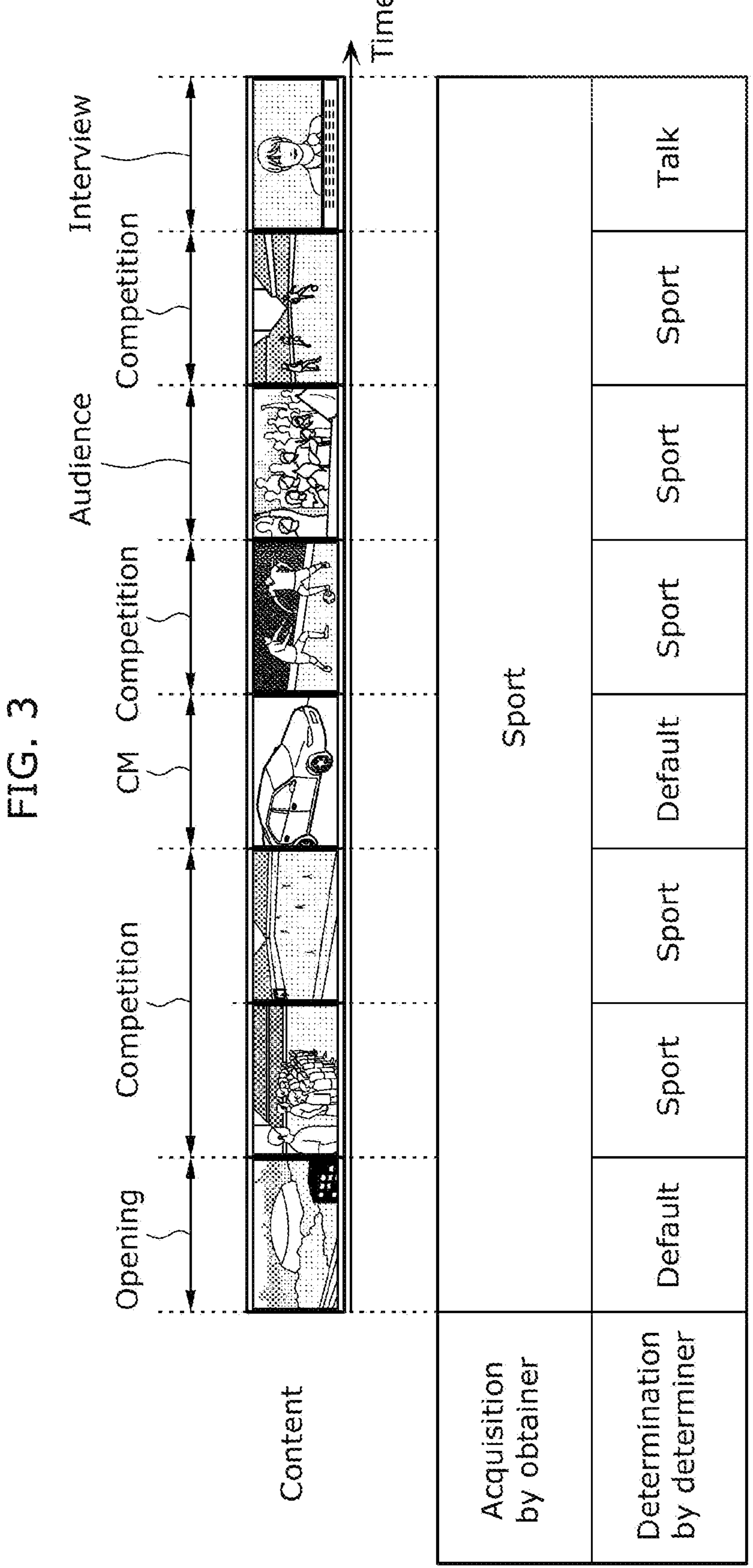
FIG. 3 is an explanatory diagram showing an example of a type obtained by an obtainer and a type determined by a determiner, regarding content according to the embodiment.

FIG. 3 is an explanatory diagram showing an example of a type obtained by obtainer 11 and a type determined by determiner 12 for content according to the present embodiment.

The content shown in FIG. 3 is an example of content obtained by obtainer 11, and is content of a broadcast program for a soccer match. More specifically, the content includes partial content of opening, competition, commercial message (CM), competition, audience, competition, and interview, in this order.

It is assumed that the SI of this content indicates that the type of this content is "sport".

Obtainer 11 obtains the SI of the content, so as to obtain information indicating "sport" (hereinafter, also simply referred to as "sport") as a type of the content as a whole.

Determiner 12 determines the type of each of the plurality of items of partial content included in the content, thereby obtaining information indicating a type of each of the plurality of items of partial content. Specifically, determiner 12 obtains "default" as the type of partial content of the opening or CM, obtains "sport" as the type of partial content of the competition or the audience, and obtains "talk" as the type of partial content of the interview.

Figure 4:
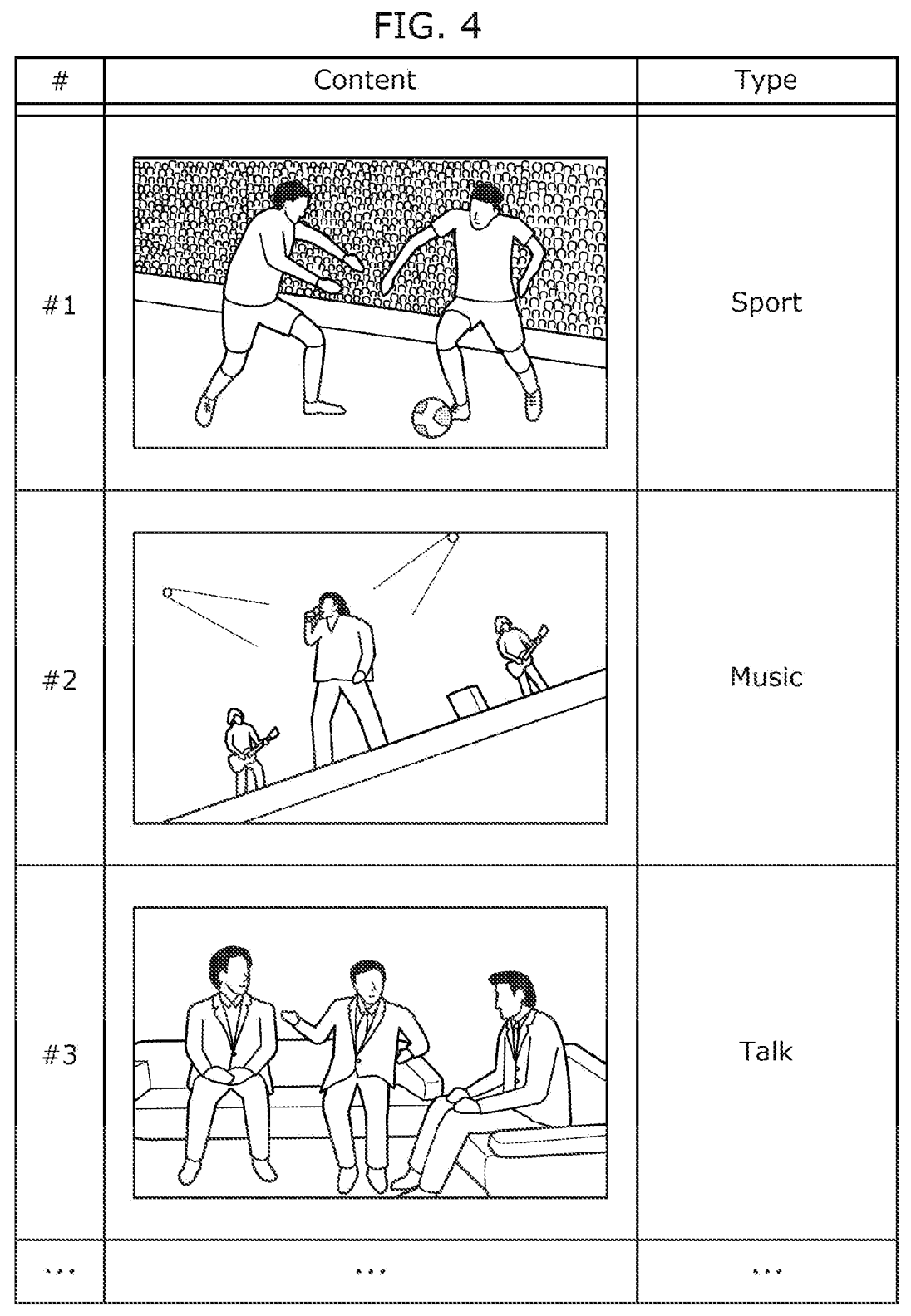

FIG. 4 is an explanatory diagram showing an example of training data used for learning for the type determination by determiner 12 according to the present embodiment.

The training data shown in FIG. 4 is training data in which one piece of partial content and one type are associated.

For example, in training data #1 shown in FIG. 4, partial content including an image that shows a player playing soccer is associated with "sport" as the type of the partial content.

Further, in training data #2, partial content including an image that shows a singer singing on a stage is associated with "music" as the type of the partial content.

Further, in training data #3, partial content including an image that shows a performer having a dialogue is associated with "talk" as the type of the partial content.

It should be noted that the training data may include not only images but also sounds.

The training data may include thousands to tens of thousands items of content in addition to the three items of partial content specifically shown in FIG. 4. In addition, the type associated with each partial content is one of a plurality of predetermined types. The plurality of predetermined types include, but are not limited to, "sport," "music," and "talk".

Determiner 12 constructs a recognition model in advance by the machine learning using the training data. The recognition model is, for example, a neural network recognition model. In that case, determiner 12 extracts a feature of an image or sound of the input partial content by training using the training data, and adjusts a coefficient of each node in the neural network so as to output a type corresponding to the input partial content, thereby constructing the recognition model.

When unknown partial content is input, the recognition model trained in this way outputs type information indicating a type of the content, based on the features of the image and sound of the input partial content.

The type information output by the recognition model is, for example, information that specifies which of a plurality of predetermined types the input partial content belongs to, and this case will be described as an example. It should be noted that the type information to be output may be information including a score that is the probability regarding classification of the input partial content into each of a plurality of the predetermined types.

Figure 5:
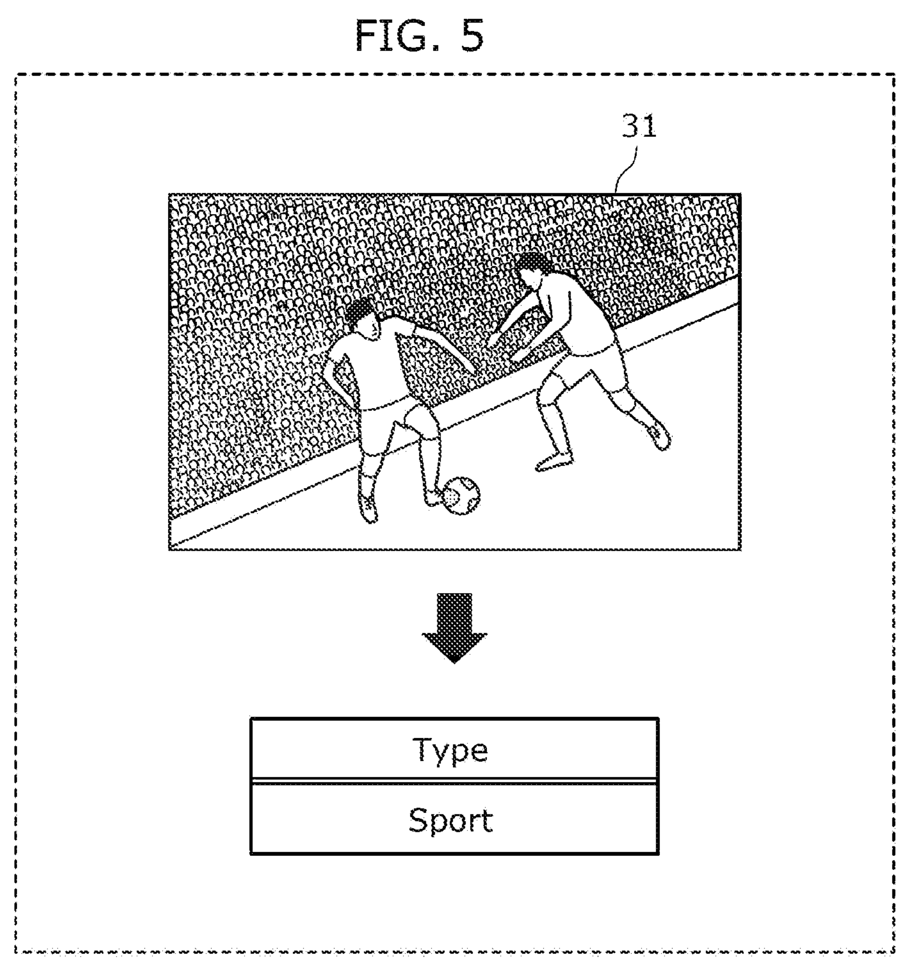
FIG. 5 is an explanatory diagram of an example of type information indicating a result of the type determination by the determiner according to the embodiment.

FIG. 5 is an explanatory diagram of an example of type information indicating a result of type determination by determiner 12 according to the present embodiment.

Determiner 12 obtains the type information output by inputting the partial content included in the content obtained by obtainer 11 into the recognition model.

For example, when partial content 31 shown in FIG. 5 is input to the recognition model, the recognition model outputs "sport" as the type of input partial content 31.

Figure 6:
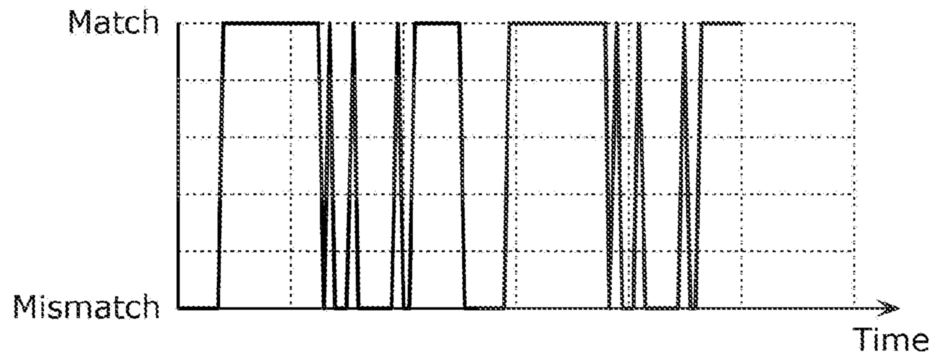
FIG. 6 is an explanatory diagram showing an example of temporal changes in match or mismatch between an obtained result obtained by the obtainer and a result of the type determination made by the determiner, according to the embodiment.

FIG. 6 is an explanatory diagram showing an example of temporal changes in match or mismatch between an obtained result obtained by obtainer 11 and a result of the type determination made by determiner 12, according to the present embodiment. Specifically, FIG. 6 is a graph showing in chronological order whether a type of partial content, which has been determined by determiner 12, matches a type of content as a whole, which has been obtained by obtainer 11.

For example, when a type of the content as a whole is "sport", and a type of the partial content is determined as "sport" by determiner 12, the types in a period corresponding to the partial content are "match". When the type of the partial content is determined as a type other than "sport", the types in the period corresponding to the partial content are "mismatch".

It should be noted that the horizontal axis in FIG. 6 has any scale. For example, a single scale corresponds to the time for 20 frames.

Figure 7:
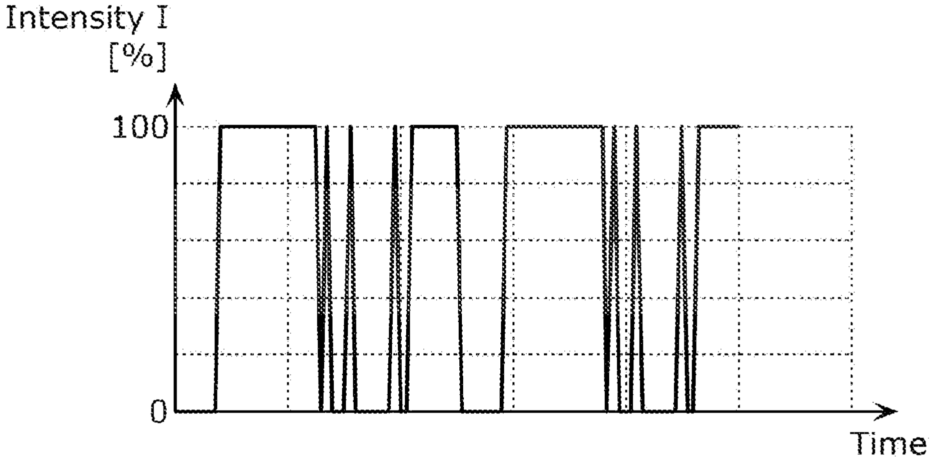
FIG. 7 is an explanatory diagram showing that an example of intensity of the presentation effect, which is indicated by control information generated by a generator according to the embodiment.

FIG. 7 is an explanatory diagram showing an example of intensity I of the presentation effect, which is indicated by the control information generated by generator 13 according to the embodiment.

Generator 13 generates the control information indicating intensity I of the presentation effect based on the match or mismatch of the types as shown in FIG. 6.

In the intensity information shown in FIG. 7, intensity I is set to 100% during a period in which the types match, and intensity I is set to 0% during a period in which the types do not match. The intensity of 0% means that no special presentation effect is applied. In other words, normal presentation is applied. It should be noted that 100% and 0% in the above are examples. The intensity information is merely needed that intensity I during the period in which the types match is set higher than intensity I during the period in which the types do not match.

When types do not match, the intensity may be changed according to combination of the first type information and the second type information.

Based on the control information shown in FIG. 7, sound controller 21 controls the intensity of the sound effect, and loudspeaker 5 outputs sound to which the sound effect with the controlled intensity is applied. Further, the intensity of the image effect is controlled by image controller 22 according to the output control information, and an image to which the image effect with the controlled intensity is applied is displayed on screen 6.

In this way, control device 10 can appropriately control the presentation effect based on the types of content.

The filter processing that is performed by generator 13 for preventing rapid changes in intensity of a presentation effect will be described below. A method using a weighted moving average can be used for the filtering processing.

Figure 9:
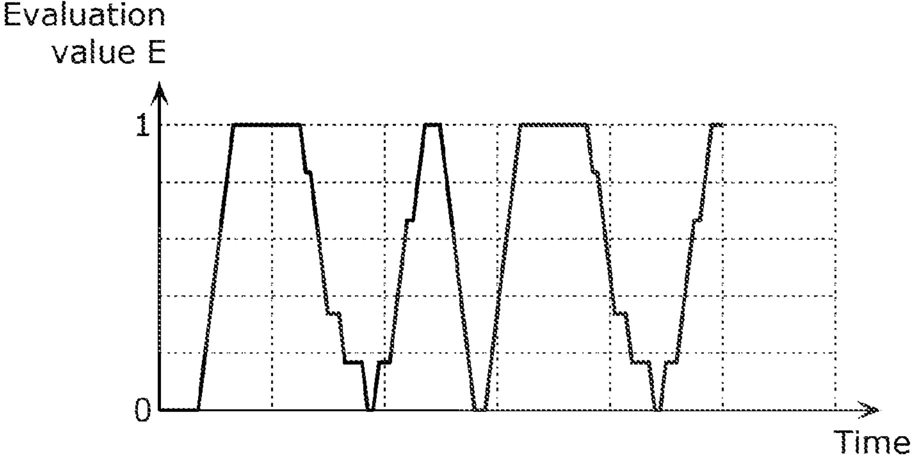
FIG. 9 shows an example of an index used for the filter processing performed by the generator according to the embodiment.
Figure 10:
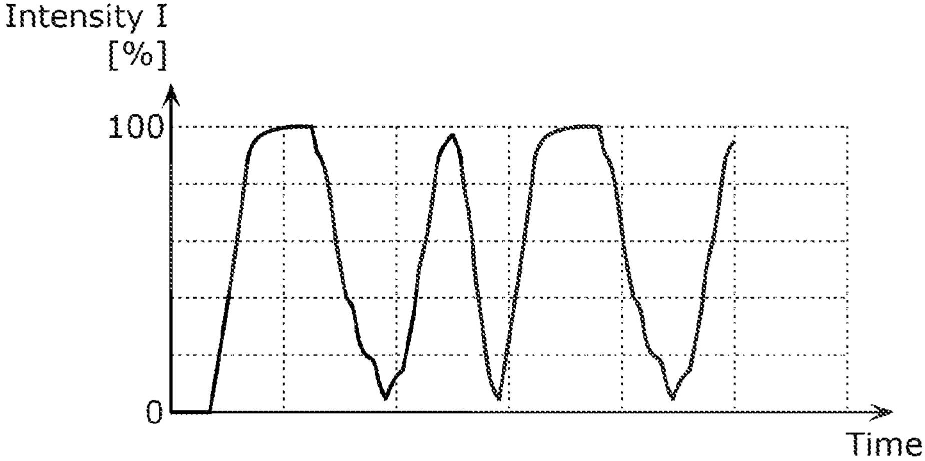
FIG. 10 shows an example of intensity of the presentation effect obtained through the filtering processing performed by the generator according to the embodiment.

FIG. 8 is an explanatory diagram showing frames to be used for calculation in the filter processing performed by generator 13 according to the present embodiment. FIG. 9 shows an example of the index used for the filter processing performed by generator 13 according to the present embodiment. FIG. 10 shows an example of the intensity of the presentation effect obtained through the filtering processing performed by generator 13 according to the present embodiment.

A frame at time t shown in FIG. 8 is a frame that is partial content subjected to the type determination. In the filtering processing, the weighted moving average shown as [Math. 1] using k+1 frames from time t−k to time t, is multiplied by Gain that is a numerical value greater than zero, to obtain [Math. 2] as evaluation value E.

$$\frac{\sum_{i=t-k}^{t}(w_{(i)}\cdot x_{(i)})}{\sum_{i=t-k}^{t}w_{(i)}} \quad \text{[Math. 1]}$$

$$\text{Gain}\times\frac{\sum_{i=t-k}^{t}(w_{(i)}\cdot x_{(i)})}{\sum_{i=t-k}^{t}w_{(i)}} \quad \text{[Math. 2]}$$

Here, k is an integer greater than 1 and indicates a calculation interval. In addition, Gain functions as a parameter for adjusting the sensitivity of changes in intensity of a presentation effect. If evaluation value E exceeds 1, it is set to 1, so that evaluation value E falls within a range of greater than 0 and 1 or less.

FIG. 9 shows temporal changes in evaluation value E calculated in this way.

As shown in FIG. 9, the temporal changes in evaluation value E corresponds to temporal changes in intensity I shown in FIG. 7 in which rapid changes are prevented.

Using this evaluation value E, intensity I(t) at time t is expressed as follows, using intensity I(t−1) immediately before time t, that is, at time t−1.

$$I(t)=E\times p+I(t-1)\times(1-p)$$

Here, p is a numerical value greater than 0 and less than 1, and functions as a parameter for performing adjustment as to which of evaluation value E and intensity I(t−1) at time t−1 is more heavily reflected in intensity I(t) at time t.

FIG. 10 shows temporal changes in intensity I calculated in this way.

The temporal changes in intensity I, which is shown in FIG. 10, corresponds to temporal changes in which the rapid change in the temporal changes in evaluation value E shown in FIG. 9 is further prevented.

The content is presented using intensity I derived in this way as the intensity of the presentation effect, to thereby control the presentation effect for each partial content and to prevent rapid change in the presentation effect.

It should be noted that the intensity of the presentation effect can also be controlled by reflecting the settings made by the user.

Figure 11:
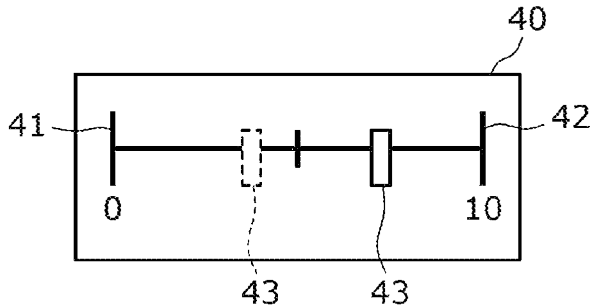
FIG. 11 is an explanatory diagram showing an example of an image of an operation bar used for user setting of the presentation effect, according to the embodiment.

FIG. 11 is an explanatory diagram showing image 40 that is an example of an operation bar used for user setting of the presentation effect, according to the present embodiment.

As shown in FIG. 11, image 40 of the operation bar shows an operation bar extending left and right. Image 40 has scale 41 indicating zero, scale 42 indicating ten, and mark 43 movable between the scales.

When image 40 is displayed on a touch panel display, mark 43 is moved left and right by a user's touch operation, and indicates a numerical value within the range of 0 to 10 depending on the position of mark 43. For example, the position of solid line mark 43 indicates the numerical value of seven, and the position of dashed line mark 43 indicates the numerical value of four.

Generator 13 reads the position of mark 43 on the operation bar, to thereby receive the setting of the intensity range of the presentation effect from the user. Then, generator 13 generates control information for controlling the presentation effect within the intensity range set by the above operation.

Specifically, generator 13 uses a numerical value read as the position of mark 43 on the operation bar as an upper limit of the presentation effect. For example, when mark 43 indicates a numerical value of seven in the operation bar indicating the range from zero to ten, the intensity of the presentation effect calculated by generator 13 is multiplied by 0.7, and a presentation effect with the resultant intensity is applied to make presentation.

With this operation, control device 10 can apply the presentation effect with intensity that reflects the user's choice regarding the intensity of the presentation effect.

It should be noted that the numerical values indicating the intensity of the presentation effect (zero, four, seven, and ten in the above) are examples, and other numerical values can be used.

It should also be noted that the operation bar is not limited to an example with the arrangement of extending left and right, and may be arranged so as to extend vertically or obliquely. Further, a shape of the operation bar is not limited to the above example, and any shape may be used as long as a user can recognize that the image is used for the operation of changing the intensity of the presentation effect.

Further, when image 40 is displayed on a normal display that is not a touch panel display, the same operation as described above can be performed by a user operating a button or key.

Processing in control device 10 configured as described above will be described.

Figure 12:
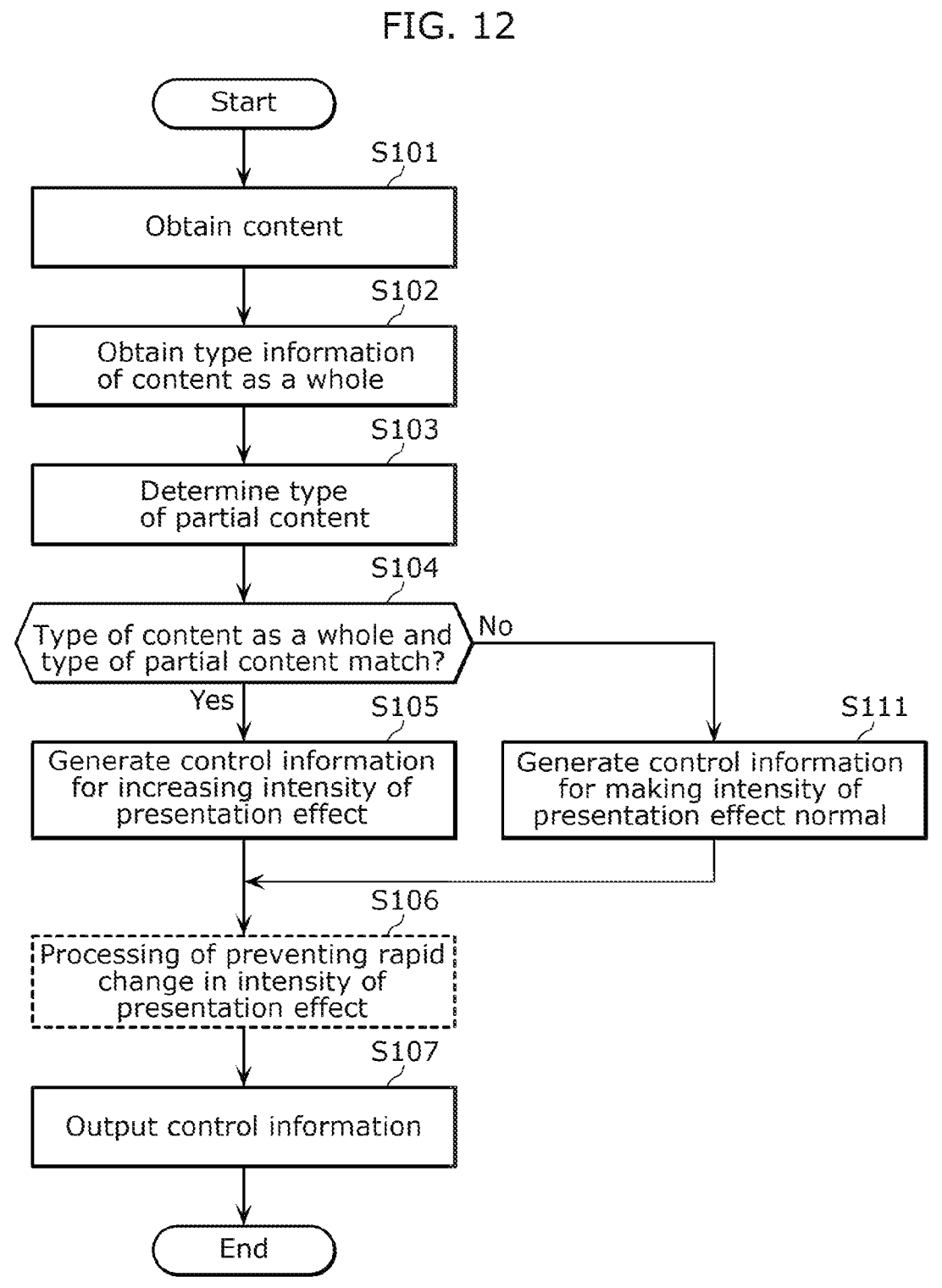

FIG. 12 is a flowchart showing a control method for control device 10 according to the present embodiment. The control method shown in FIG. 12 may be performed for each frame of content.

In Step S101, obtainer 11 obtains content.

In Step S102, obtainer 11 obtains type information indicating a type of content as a whole, regarding the content obtained in Step S101.

In Step S103, determiner 12 performs type determination processing on the content obtained in Step S101, thereby obtaining type information for each of a plurality of items of partial content included in the content.

The processing in subsequent Steps S104, S105 and S111 is executed for each of the plurality of items of partial content.

In Step S104, generator 13 determines whether type information of the content as a whole, which is obtained in Step S101, matches type information of each of the plurality of items of partial content obtained in Step S102. If the above two items of type information match (Yes in Step S104), the processing proceeds to Step S105. If they do not match (No in step S104), the processing proceeds to Step S111.

In Step S105, generator 13 generates the control information for increasing the intensity of a presentation effect for the partial content subjected to the processing. The control information for increasing intensity of the presentation effect is, in other words, control information for increasing intensity of the presentation effect higher than a case when intensity of the presentation effect is normal (Step S111). The control information for increasing the intensity of the presentation effect is, for example, control information indicating 100% in FIG. 7.

In Step S111, generator 13 generates the control information that sets the intensity of the presentation effect to normal (i.e., without applying a special presentation effect) for the partial content subjected to the processing. The control information that sets the intensity of the presentation effect to normal is, in other words, control information that sets the intensity of the presentation effect to be reduced compared to a case when the intensity of the presentation effect is increased (Step S105). Control information that sets the intensity of the presentation effect to normal is, for example, control information indicating 0% in FIG. 7.

Generator 13 performs processing in Step S105 or Step S111 for each of the plurality of items of partial content, to thereby obtain the temporal changes of intensity I illustrated in FIG. 7.

In step S106, generator 13 performs the filtering processing for preventing rapid changes in the intensity of the presentation effect. With this operation, generator 13 obtains the temporal changes of intensity I shown in FIG. 10.

It should be noted that processing in Step S106 need not be performed. When processing in Step S106 is performed, it is necessary to calculate the intensity of the presentation effect for a predetermined period before the partial content to be subjected to the processing.

In Step S107, generator 13 outputs control information. The control information to be output includes type information indicating the type of the presentation effect and information indicating intensity I of the presentation effect. Intensity I is obtained in processing in Step S105 or Step S111, and has undergone the filtering processing when the filtering processing in Step S106 is performed.

The intensity of the sound effect by sound controller 21 is controlled by the control information output in processing in Step S107, and the sound accompanied by the sound effect, the intensity of which is controlled, is output from loudspeaker 5. Furthermore, the intensity of the image effect by image controller 22 is controlled according to the output control information, and an image accompanied by the image effect of the controlled intensity is displayed on screen 6.

Through the series of processing shown in FIG. 12, it is possible to appropriately control the presentation effect based on the type of content.

As described above, the embodiments have been described as an example of the technique in the present disclosure. For the description, the accompanying drawings and detailed description have been provided.

Accordingly, among structural components described in the attached drawings and detailed description, components that are not essential for solving the problem are included in addition to components that are essential for solving the problem, in order to exemplify the above technique. Therefore, it should not be immediately recognized that those non-essential components are essential just because they are described in the attached drawings and detailed description.

In addition, the above-described embodiments are intended to illustrate the technique of the present disclosure, and various changes, replacements, additions, omissions, and the like can be made within the scope of claims or equivalents thereof.

INDUSTRIAL APPLICABILITY

The present disclosure is applicable to television receivers, recording devices, and the like.

REFERENCE SIGNS LIST

1 television receiver
5 loudspeaker
6 screen
10 control device
11 obtainer
12 determiner
13 generator
21 sound controller
22 image controller
31 partial content
40 image
41,42 scale
43 mark

The invention claimed is:

1. A control device comprising:

an obtainer that obtains content and first type information indicating a type of the content;

a determiner that performs type determination processing on the content obtained by the obtainer, to obtain second type information indicating a type of the content; and a generator that determines whether the first type information and the second type information match, and generates and outputs control information for increasing intensity of a presentation effect to be applied at a time of presentation of the content when the first type information and the second type information are determined to match, compared to when the first type information and the second type information are determined not to match, wherein the first type information indicates the type of the content as a whole, the second type information indicates a type of each of a plurality of items of partial content included in the content, the determiner obtains the second type information by determining the type of each of the plurality items of partial content included in the content, and the generator calculates intensity of the presentation effect for each of the plurality of items of partial content included in the content, and performs filtering processing that prevents rapid temporal changes in the intensity of the presentation effect calculated.

2. The control device according to claim 1, wherein in the type determination processing, the determiner inputs the content to a recognition model constructed by machine learning, and obtains type information of the content as the second type information, the type information being output by the inputting of the content to the recognition model.

3. The control device according to claim 2, wherein the first type information indicates the type of the content as a whole, and the determiner determines a type of each of a plurality of items of partial content included in the content.

4. The control device according to claim 1, wherein the obtainer obtains, as the first type information, information set as information indicating the type of the content from a device different from the control device.

5. The control device according to claim 1, wherein the obtainer obtains type information of the content as the first type information, the type information being obtained by analyzing the content obtained.

6. The control device according to claim 1, wherein the control information includes information indicating in time series the intensity of the presentation effect at the time of presentation of the content.

7. The control device according to claim 1, wherein the generator performs processing of preventing a rapid change in the intensity of the presentation effect at the time of presentation of the content, when generating the control information.

8. The control device according to claim 1, wherein the generator includes association information in which type information indicating the type of the content and the presentation effect to be applied at the time of presentation of the content of the type are associated in advance, and generates, as the control information, control information for applying the presentation effect associated in advance with the first type information, when generating the control information.

9. The control device according to claim 1, wherein the generator generates, as the control information, control information for increasing intensity of at least one of a sound effect or a video effect as the presentation effect at the time of presentation of the content.

10. The control device according to claim 1, wherein the generator receives an operation of setting an intensity range of the presentation effect from a user, and generates the control information for controlling the presentation effect within the intensity range set through the operation.

11. The control device according to claim 1, wherein the filtering processing is one of low-pass filter processing, noise removal processing, or smoothing processing.

12. The control device according to claim 1, wherein the filtering processing is processing using a moving average.

13. The control device according to claim 1, wherein the generator generates and outputs control information for changing intensity of a presentation effect to be applied at a time of presentation of the content, the control information being generated according to combination of the first type information and the second type information.

14. The control device according to claim 1, wherein the determiner obtains the second type information by individually analyzing each of the plurality of items of partial content, each item of partial content being a segment of the content divided in units of one or more frames.

15. A control method comprising:
obtaining content and first type information indicating a type of the content;
performing type determination processing on the content obtained, to obtain second type information indicating a type of the content; and
determining whether the first type information and the second type information match,
generating and outputting control information for increasing intensity of a presentation effect to be applied at a time of presentation of the content when the first type information and the second type information are determined to match, compared to when the first type information and the second type information are determined not to match,
wherein
the first type information indicates the type of the content as a whole,
the second type information indicates a type of each of a plurality of items of partial content included in the content,
the method further comprises obtaining the second type information by determining the type of each of the plurality items of partial content included in the content, and
the generating the control information includes calculating intensity of the presentation effect for each of the plurality of items of partial content included in the content and performing filtering processing that prevents rapid temporal changes in the intensity of the presentation effect calculated.

16. The control method according to claim 15, wherein the filtering processing is one of low-pass filter processing, noise removal processing, or smoothing processing.

17. The control method according to claim 15, wherein the filtering processing is processing using a moving average.

18. The control method according to claim 15, wherein the generating and outputting the control information includes generating and outputting control information for changing intensity of a presentation effect to be applied at a time of presentation of the content, the control information being generated according to combination of the first type information and the second type information.

19. The control method according to claim 15, wherein the obtaining of the second type information comprises individually analyzing each of the plurality of items of partial content, each item of partial content being a segment of the content divided in units of one or more frames.

20. A non-transitory computer-readable recording medium having recorded thereon a program for causing a computer to execute the control method according to claim 15.

* * * * *